L. W. GREVE.
FLUID OPERATED TOOL.
APPLICATION FILED MAR. 25, 1914.
1,134,123. Patented Apr. 6, 1915.
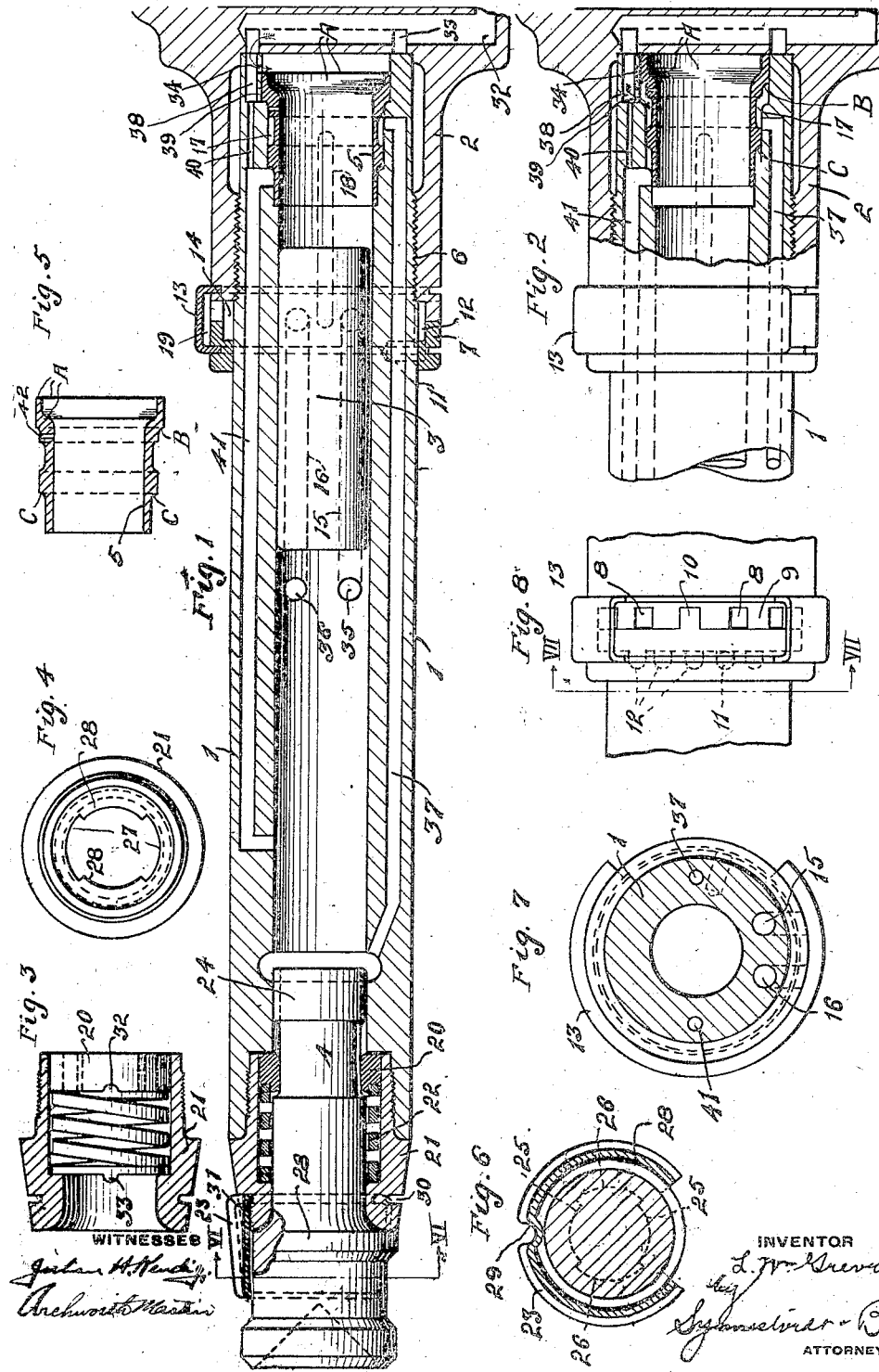

UNITED STATES PATENT OFFICE.

LOUIS W. GREVE, OF CLEVELAND, OHIO, ASSIGNOR TO THE CLEVELAND PNEUMATIC TOOL COMPANY, OF CLEVELAND, OHIO, A CORPORATION OF OHIO.

FLUID-OPERATED TOOL.

1,134,123.   Specification of Letters Patent.   Patented Apr. 6, 1915.

Application filed March 25, 1914. Serial No. 827,059.

*To all whom it may concern:*

Be it known that I, LOUIS W. GREVE, a citizen of the United States, residing at Cleveland, in the county of Cuyahoga and State of Ohio, have invented certain new and useful Improvements in Fluid-Operated Tools, of which the following is a specification.

The invention relates to fluid operated tools, and as particularly illustrated—to riveting hammers. The invention has for its primary objects; the provision of an improved and simplified shell valve construction; the provision of an improved and simplified rivet set retaining means in which the parts can be very quickly and conveniently assembled and disassembled and in which the danger of accidental disconnection of the parts is eliminated; the provision of an improved locking means for securing the body and handle of the apparatus against unscrewing; and the provision of a locking means of the character specified in which a part of the said means act as an exhaust shield. One embodiment of the invention is illustrated in the accompanying drawing, wherein—

Figure 1 is a longitudinal section through the tool, with the distributing shell valve in one operative position, Fig. 2 is a partial side elevation and partial section at the rear end of the tool, showing the distributing valve in a position different from that of Fig. 1, Figs. 3 and 4 are sectional and end elevation views of a portion of the rivet set retaining means, Fig. 5 is a sectional view of the distributing valve removed from its position of use and on an enlarged scale, Fig. 6 is a section on the line VI—VI of Fig. 1, Fig. 7 is a section on the line VII—VII of Fig. 8, and Fig. 8 is a partial bottom view of the casing at the point of juncture between the two parts.

Referring first to the general arrangement of parts as illustrated in Fig. 1, 1 is the main portion of the casing of the machine; 2 is the handle portion of such casing; 3 is the hammer piston; 4 is the rivet set, and 5 is the distributing valve which is of the cylindrical or shell type.

The parts 1 and 2 of the casing are screw threaded together as indicated at 6, and accidental unscrewing at this point is prevented by means of the locking ring 7. The forward edge of the casing member 2 which opposes the locking ring 7 is provided with alternating slots and lugs 8 and 9 as indicated in Fig. 8, and the locking ring 7 is provided with a lug 10 which is adapted to fit into any one of the slots 8, depending upon the position of such slot when the member 2 is screwed tight upon the member 1. The locking ring 7 is slidable longitudinally of the casing member 1, but is held against rotation with respect thereto, by means of a pin 11 screw threaded into the casing 1 and projecting below such casing a slight distance as indicated in Fig. 1. This projecting end of the pin or screw 11 is adapted to engage any one of a plurality of slots 12 (Fig. 8) cut in the inner face of the locking ring 7. The provision of this plurality of slots 12—any one of which may be engaged by the pin 11—serves to permit of a rotary adjustment of the locking ring 7. This adjustment combined with the adjustment afforded by the plurality of the slots 8 in the front edge of the member 2 serves to provide for the locking of the member 2 with respect to the member 1 in any position at which it may arrive when the parts are screwed tightly together. The outer surfaces of the locking ring and the member 2 are grooved, and into these grooves fits the spring retaining clip 13, such spring retaining clip 13 extending about three quarters of the distance around the casing as indicated in Fig. 7. This clip 13 not only serves to prevent the movement of the locking ring 7 to the left, but also acts as a shield for the exhaust as hereinafter explained. In assembling the parts the ring 7 is slipped over the casing member 1 from its left hand end, and the handle member 2 is screwed into the position illustrated. The ring 7 is then moved to the right until one of the slots 12 engages the head of the pin 11, at which time the lug 10 on the locking member 7 (Fig. 6) will engage one of the slots 8 in the end of the handle member 2. This engagement of course prevents any unscrewing of the handle, since the screw or pin 11 prevents the rotation of the ring 7. The spring clip 13 is then snapped into the position illustrated in Fig. 1, which prevents the ring 7 from moving to the left and thus becoming disengaged from the handle member 2. The inner faces of the ring 7 and end of the member 2 are provided with the annular recess 14 to which the right hand end of the exhaust passages 15 and 16 are connected. This exhaust groove 14 is also connected with the groove 17 around the outer surface of the distributing valve 5, by means of the passage 18, so that all three passages 15, 16, and 18 discharge into the groove 14 beneath the spring clip 13. The discharge from the groove 14 passes through the space 19 via the various slots 8 which are not occupied by the lug 10 (Fig. 8). The air which discharges to the space 19 of course follows the clip circumferentially until it reaches the end thereof, when it discharges into the atmosphere. It will thus be seen that the clip 13 not only performs the function of a holding means for the ring 7, preventing its movement to the left, but also serves the function of a shield for the exhaust.

The rivet set retaining device comprises a retaining ring 20, a chuck member 21 screwed into the end of the casing 1, a spring 22 interposed between the end of the chuck and the ring 20, and the spring clip 23 which prevents the set 4 from rotating but does not prevent its longitudinal movement. The construction is such, as will hereinafter appear, that when the spring clip 23 is removed and the set rotated 90° it may be withdrawn through the ring 20 and a new set inserted. This result is secured by forming the head 24 at the rear end of the set with a pair of grooves 25 and a pair of lugs 26, as indicated in dotted lines in Fig. 6, and the ring 10 with a corresponding pair of grooves 27 and a pair of lugs 28 (Fig. 4). When the set is in the rotative position illustrated in Fig. 1 the lugs 26 on the head of the rivet set come opposite the lugs 28 and the ring 20 limits the forward movement of the set. When, however, the spring clip 23 is removed and the rivet set rotated 90° the lugs 26 come opposite the grooves 27 and the rivet set can be moved forward and removed from the machine. The forward end of the rivet set is provided with a collar 28 provided with a groove for the reception of the bend 29 in the holding clip 23, so that the rivet set can move longitudinally but not rotatably with respect to the member 23. The end of the member 21 is provided with a circumferential groove 30 which receives the flange at the rear end of the member 23, the member 21 also being grooved longitudinally at 31 to receive the bent-in portion 29 of the member 23, so that the member 23 is held against circumferential movement. It will be seen therefore that the releasable spring member 23 is held against circumferential movement and in turn retains the rivet set against circumferential movement, while permitting longitudinal movement thereof. Also that when the member 23 is removed and the rivet set rotated 90° it can be removed endwise from the machine. In order to prevent the rotation of the ring 20 the spring 22 is provided with a lug 32 fitting into a recess in the end of the collar, and the spring is itself prevented from rotating by means of another lug 33 which fits into a recess in the member 21 as indicated in Fig. 3. Provision is thus made for the quick and convenient removal or replacement of the rivet set, while at the same time means are provided securely guarding the parts against accidental displacement.

The shell valve 5 has three pressure receiving areas for causing the movement of the valve back and forth, the area A consisting of the two surfaces illustrated in Fig. 5, designed to secure the movement of the valve to the left, while the areas B and C are designed to secure the movement of the valve to the right. The construction and arrangement of parts is such that when the piston 3 moves to the right and approaches the end of its stroke a body of air is compressed at the right hand end of the valve 5 and acting upon the area A causes the valve to move to the left. The area B is exposed to a continuous live air pressure tending to move the valve to the right, while the area C is exposed to a continuous pressure which is variable in amount and is controlled by the piston. When the pressure on the area C becomes a maximum, such pressure in connection with the pressure on the area B, is sufficient to cause the movement of the valve to the right. The variable pressure on the area C is secured by supplying live air continuously to such area, but also permitting it to exhaust continuously. The arrangement is such that when the piston reaches the left hand end of its stroke this exhaust from area C is cut off so that the pressure rises, and the combined pressures on the areas B and C secure the movement of the valve, the pressure on the area A at such time being materially reduced by the opening of the exhaust from the right hand end of the piston 3.

Starting with the parts in the position illustrated in Fig. 1, air is supplied to the space behind (to the right) the piston 3, via the passages and ports 32, 33, and 34. At this time the valve 5 is in its position to the left, by reason of the fact that a body of air has been compressed by the movement of the piston to the right, and this body of compressed air acting upon the surface A causes the valve to move to the position shown. At this time air is exhausting from the front side of the piston via the ports 35 and 36 leading into the exhaust passages 15 and 16 which in turn discharge into the exhaust groove 14 are heretofore stated. Exhaust is also occurring through the passage 37 communicating at its rear end with the groove 17, such groove in turn communicating with the passage 18 leading to the discharge groove 14 as heretofore described.

At this time live air is being supplied to the surface B via the passage 38 and port 39, but because of the smallness of the area B this force is insufficient to move the valve to the right. Pressure is also being applied at this time to the area C via the relatively small passage 40 leading into the large passage 41. This pressure tending to move the valve to the right, is however substantially negligible, since the passage 41 exhausts freely to the front end of the cylinder, thus preventing the accumulation of any substantial pressure in the passage 41.

The application of pressure to the rear side of the piston 3 causes it to move forward until it covers the exhaust ports 35 and 36, and the end of the passage 41. The covering of the end of the exhaust passage 41 of course causes pressure to build up in this passage so that the pressure on the surface C of the valve is greatly increased, and this increase of pressure accompanied by a decrease of pressure to the right of the piston caused by the uncovering of the exhaust ports 35 and 36 when the piston reaches its extreme left hand position causes the movement of the valve 5 to the right of the position indicated in Fig. 1 to that indicated in Fig. 2. This movement of the valve to the position indicated in Fig. 2 closes the port 34 so that no more air is supplied to the right hand side of the piston. It also places the port 39 in communication with the groove 17 around the valve, and this groove at this time registers with the end of the passage 37, so that a supply of air is provided on the left hand side of the piston, causing it to move to the right. During this movement to the right the fluid behind the piston is exhausted through the ports 35 and 36 and the passages 15 and 16, such exhaust continuing until the ports 35 and 36 are covered by the piston, after which time no more fluid is exhausted from the right hand side of the piston. The movement of the piston to the right during the remainder of its stroke causes compression of a volume of air at the valve 5, and this pressure acting upon the surface A throws the valve back to the position of Fig. 1 when the piston approaches the rear end of its stroke. This action is also facilitated by the reason that the pressure on the surface C is reduced when the exhaust ports 35 and 36 are uncovered, thus allowing the pressure in the forward end of the cylinder and in the passage 41 to be reduced. The cycle is then repeated as heretofore described. A small port 42 is provided through the wall of the valve 5 to permit of the starting of the machine in case it should stop with the piston 3 in its rear position and with the valve 5 in the position of Fig. 2. The passage 42 permits of the building up of pressure in the space behind the piston to cause the movement of the valve to the left, thus bringing the parts to the position indicated in Fig. 1.

It will be seen from the foregoing that the shifting of the shell valve in one direction is secured by pressure produced by the movement of the piston to the rear, and that the movement of the valve in the reverse direction is secured by a pressure upon two areas of the valve, one of such pressures being constant, and the other being variable and controlled by the piston.

What I claim is:

1. In combination in a fluid operated tool, a cylindrical distributing valve open at both ends and having a rearwardly facing pressure area, a hammer piston adapted to pass into the said valve at the rear end of its stroke and compress a volume of fluid, the said pressure receiving area of the valve being adapted to be acted upon by the said compressed fluid to cause the shifting of the valve forwardly, and having another area exposed to continuous pressure tending to shift the valve in the reverse direction.

2. In combination in a fluid operated tool, a cylindrical distributing valve open at both ends and having a rearwardly facing pressure area, a hammer piston adapted to pass into the said valve at the rear end of its stroke and compress a volume of fluid, the said pressure receiving area of the valve being adapted to be acted upon by the said compressed fluid to cause the shifting of the valve forwardly, and having another area exposed to continuous pressure tending to shift the valve in the reverse direction, such continuous pressure being variable in amount and controlled by the hammer piston.

3. In combination in a fluid operated tool, a cylindrical distributing valve open at both ends and having a rearwardly facing pressure area, a hammer piston adapted to pass into the said valve at the rear end of its stroke and compress a volume of fluid, the said pressure receiving area of the valve being adapted to be acted upon by the said compressed fluid to cause the shifting of the valve forwardly, and having another area exposed to continuous pressure tending to shift the valve in the reverse direction, such continuous pressure being varied by an exhaust controlled by the hammer piston.

4. In combination in a fluid operated tool, a cylindrical distributing valve open at both ends and having a rearwardly facing pressure area, a hammer piston adapted to pass into the said valve at the rear end of its stroke and comprises a volume of fluid, the said pressure receiving area of the valve being adapted to be acted upon by the said compressed fluid to cause the shifting of the valve forwardly, and having another area exposed to continuous pressure tending to shift the valve in the reverse direction, such continuous pressure being reduced by an exhaust passage which is closed by the hammer piston when it approaches the end of its forward stroke.

5. In combination in a fluid operated tool, a cylindrical distributing valve, a hammer piston adapted to pass into the said valve at the rear end of its stroke and compress a volume of fluid, the said valve having an area adapted to be acted upon by the said compressed fluid to cause the shifting of the valve, and having two other areas one of which is acted upon by a constant pressure and the other of which is acted upon by a continuous variable pressure, the pressures on said two areas tending to shift the valve in a direction the reverse to that secured by the action of the said volume of fluid compressed by the hammer piston.

6. In combination in a fluid operated tool, a cylindrical distributing valve, a hammer piston adapted to pass into the said valve at the rear end of its stroke and compress a volume of fluid, the said valve having an area adapted to be acted upon by the said compressed fluid to cause the shifting of the valve, and having two other areas one of which is acted upon by a constant pressure and the other of which is acted upon by a continuous variable pressure controlled by the hammer piston, the pressures on said two areas tending to shift the valve in a direction the reverse to that secured by the action of the said volume of fluid compressed by the hammer piston.

7. In combination in a fluid operated tool, a cylindrical distributing valve, a hammer piston adapted to pass into the said valve at the rear end of its stroke and compress a volume of fluid, the said valve having an area adapted to be acted upon by the said compressed fluid to cause the shifting of the valve, and having two other areas one of which is acted upon by a constant pressure and the other of which is acted upon by a continuous pressure made variable by an exhaust shut off by the hammer piston as it approaches the forward end of its stroke, the pressures on said two areas tending to shift the valve in a direction the reverse to that secured by the action of the said volume of fluid compressed by the hammer piston.

8. In combination in a fluid operated tool, a shell distributing valve, a piston whose movements are controlled by the said valve and passing into said valve in its rearward movement, the said valve being moved in one direction by fluid compressed by the piston, and in the other direction by a constant pressure and by a variable continuous pressure.

9. In combination in a fluid operated tool, a shell distributing valve, a piston whose movements are controlled by the said valve and passing into said valve in its rearward movement, the said valve being moved in one direction by fluid compressed by the piston, and in the other direction by a constant pressure and by a variable continuous pressure controlled as to amount by the piston.

10. In combination in a fluid operated tool, a shell distributing valve, a piston whose movements are controlled by the said valve and passing into said valve in its rearward movement, the said valve being moved in one direction by fluid compressed by the piston, and in the other direction by a constant pressure and by a variable continuous pressure reduced by an exhaust controlled by the piston.

11. In combination in a fluid operated tool, a shell distributing valve having a pressure area for shifting the valve in one direction and two other pressure areas for shifting the valve in the other direction; a piston whose movements are controlled by the said valve and which in its movement in one direction compresses a charge of fluid which operates against the first mentioned area to shift the valve in one direction, and connections whereby a constant pressure is applied to one of said two other pressure areas and whereby a variable pressure is applied to the other of the two other pressure areas, said variable pressure being controlled by the piston.

12. In a fluid operated tool, a piston, an automatic distributing valve arranged to control the admission and exhaust to and from the cylinder, pressure means for moving the valve in one direction, and two pressure surfaces carried by the valve for securing its movement in the reverse direction, one of said surfaces being exposed to a constant pressure and the other surface to a variable pressure.

13. In a fluid operated tool, a piston, an automatic distributing valve arranged to control the admission and exhaust to and from the cylinder, pressure means for moving the valve in one direction, and two pressure surfaces carried by the valve for securing its movement in the reverse direction, one of said surfaces being exposed to a constant pressure and the other surface to a variable pressure governed by the piston.

In testimony whereof I have hereunto signed my name in the presence of the two subscribed witnesses.

LOUIS W. GREVE.

Witnesses:
 GEO. H. HALL,
 J. DE MOOY.